United States Patent [19]

Robertson et al.

[11] 4,170,487

[45] Oct. 9, 1979

[54] PROCESS FOR GRANULATING PIGMENT COMPOSITIONS

[75] Inventors: George H. Robertson, Cincinnati, Ohio; Robert L. Rooney, Beith; Robert B. Todd, Paisley, both of Scotland

[73] Assignee: Ciba-Geigy Corporation, Ardsley, N.Y.

[21] Appl. No.: 889,678

[22] Filed: Mar. 24, 1978

[30] Foreign Application Priority Data

Nov. 18, 1977 [GB] United Kingdom ............... 48062/77

[51] Int. Cl.$^2$ ................................................ C09C 3/08
[52] U.S. Cl. ................................. 106/309; 106/288 B; 106/288 Q; 106/308 Q; 106/308 C; 106/308 F; 106/308 N; 106/308 M
[58] Field of Search .......... 106/308 N, 308 C, 308 M, 106/288 Q, 309

[56] References Cited

U.S. PATENT DOCUMENTS

| 2,822,337 | 2/1958 | Evans | 252/465 |
|---|---|---|---|
| 4,001,035 | 1/1977 | Ito et al. | 106/308 M |
| 4,015,999 | 4/1977 | Robertson et al. | 106/288 Q |
| 4,036,652 | 7/1977 | Rothmayer | 106/308 N |
| 4,055,439 | 10/1977 | Bäbler | 106/288 Q |

OTHER PUBLICATIONS

Kirk-Othmer-Encyclopedia of Chem Tech-vol. 2, (1964), pp. 416, 418–419, 600; Suppl. vol. (1972), pp. 888, 889, 896.

Primary Examiner—Helen McCarthy
Attorney, Agent, or Firm—Joseph F. DiPrima

[57] ABSTRACT

A process for producing a pigment or dyestuff composition in the form of dustless readily-dispersible granules which comprises contacting, with agitation, an aqueous dispersion of a pigment, a protective colloid, an aliphatic or araliphatic amine which is liquid at temperatures below 100° C., insoluble in water at pH values above 7, and soluble in water at pH values below 7, and an organic carrier, the pH value being first above 7, maintaining the temperature above the melting point of the amine compound, and reducing the pH to below 7 to render the amine compound soluble in water, and recovering the resulting granules.

14 Claims, No Drawings

PROCESS FOR GRANULATING PIGMENT COMPOSITIONS

The present invention relates to a process for the preparation of dustless, readily-dispersible pigment or dyestuff granules.

The preparation of pigment granules by a process which comprises stirring together an aqueous pigment dispersion and a solution of a water-insoluble organic carrier in a water-immiscible organic liquid is known. However, in the known processes the resulting product contains some solvent, and it is necessary to remove the organic solvent from the product by distillation. We have now discovered a process in which the product is obtained directly in a solvent free condition.

According to the present invention there is provided a process for producing a pigment or dyestuff composition in the form of dustless readily-dispersible granules which process comprises contacting, with agitation, an aqueous dispersion of a pigment, and an aliphatic or araliphatic amine which is liquid at temperatures below 100° C., insoluble in water at certain pH values above 7, and soluble in water at pH values below 7, the pH value being first above 7, maintaining the temperature above the melting point of the amine compound and reducing the pH to below 7, to render the amine compound soluble in water and recovering the resulting granules.

The aliphatic amine is preferably an aliphatic amine such as a $C_6$–$C_{12}$ linear, branched or substituted alkyl or cycloalkyl amine for example n-hexylamine, n-octylamine, di-isobutylamine, 2-ethyl hexylamine, cyclohexylamine or Primene 81R (a synthetic $C_{12}$ branched aliphatic amine ex. Rohm and Haas). As araliphatic amine NN'-dimethylbenzylamine is mentioned.

Usually the amount of amine used is from 0.1 to 2 parts, preferably 0.3 to 0.6 parts by weight per part of pigment.

The process may also be carried out in the presence of an organic carrier. The organic carrier may be any organic compound which is soluble in, or at least softened by, the amine compound, and is insoluble or can be rendered insoluble in water throughout the pH range used in the process. The carrier can be a liquid if the ratio of pigment to carrier is high, for example at or above 90:10; at lower proportions of pigment it is preferable to have a compound having a melting point above 40° C. as carrier.

Suitable carriers include, for example, carboxylic acid esters derived from alkyl, aryl, aralkyl or cycloalkyl carboxylic acid or polyacids and alkyl, aryl, aralkyl, or cycloalkyl mono- or polyhydroxy compounds, such as the fatty acid esters cetyl palmitate, glycerol tristearate, glycerol monostearate, glycerol tripalmitate, glycerol trioleate, ethylene glycol dilaurate, ethylene glycol distearate, diethylene glycol distearate or the benzoic acid esters, such as ethylene glycol dibenzoate, neopentyl glycol dibenzoate trimethylol ethane tribenzoate, trimethylol propane tribenzoate or the dicarboxylic acid esters, such as dibenzyl phthalate, dibutyl phthalate, dioctyl phthalate, dicyclohexyl phthalate, and similar esters of adipic, sebacic or azelaic acids; amides from the above carboxylic acids and ammonia, or alkyl aryl, aralkyl or cycloalkyl mono- or poly-amides, such as stearamide, oleamide, palmitamide, N-alkyl stearamides or oleamides, ethylene bis stearamide; phosphate esters such as triphenyl or tricresyl phosphate, resins such as hydrocarbon resins, xylene-formaldehyde resins, coumarone, coumarone-indene and ketone resins; vinyl polymers, such as polyvinyl chloride and vinyl chloride copolymers, acrylate and methacrylate polymers and copolymers, polyvinyl acetate and vinyl acetate copolymers; styrene homo and copolymers; polyolefines such as polyethylene, polypropylene and polyisobutylene; fatty alcohols which are water insoluble, such as, cetyl alcohol and stearyl alcohol; and fatty amines which themselves do not give water soluble salts, such as didodecyl amine and distearyl monomethyl amine; and fatty oxazolines; water insoluble carboxylic acids, for example $C_{12}$ and greater fatty acids, such as lauric acid, stearic acid, behenic acid and the rosin derivatives, such as wood rosin or its hydrogenated or disproportionated versions. These acids may also be added to the pigment as their alkali metal or ammonium salt dissolved in water: in this case the process is preferably carried out in the presence of water soluble inorganic salts, e.g. sodium chloride or calcium chloride.

These acids are applied as their soluble salts and may also be combined with the non-water soluble carriers, especially the sorbitan esters; such combinations give granules which are extremely useful for pigmentation of PVC.

The weight ratio of pigment or dyestuff to carrier may be up to 33.3:66.7, preferably from 95:5 to 50:50, more preferably from 90:10 to 60:40.

When the process is carried out in the presence of an organic carrier, the amount of amine compound used is that which will form a solution of or at least soften the carrier. When using high ratios of pigment to carrier or when using a carrier which is poorly soluble in the amine compound, higher proportions of the amine compound may be needed to form satisfactory granules.

The pigments and dyestuffs that can be used are those which are water insoluble and stable in the pH range required for granule formation and isolation. Suitable pigments are azo, azomethine, anthraquinone, phthalocyanine, nitro, perinone, perylene, dioxazine, thioindigo, isoindolinone, quinacridone, quinophthalones azo or azomethine metal salts or complexes; mixtures of pigments may also be used. Water insoluble dyestuffs are those such as the solvent soluble azo and phthalocyanine dyes. These dyes can also be used as mixtures and in admixture with the pigment.

The organic carrier may be added with the amine compound, either dissolved or dispersed in the amine or both may be added prior to any heating or at any point during the heating cycle. The carrier may also be added in the form of an aqueous dispersion, for example, an aqueous dispersion of a polymer or resin such as polyvinyl chloride, vinyl chloride copolymer or low molecular weight (oxidised) polyethylene.

As well as using pure pigments or dyestuffs, ready-for-use pigment preparations may be used, i.e. preparations which contain, in addition to the pigment, for example 5 to 90 percent, preferably from 10 to 40 percent by weight of a carrier.

Preferably a protective colloid is added to the mixture to assist in the formation of granules and the production of granules of a more uniform size distribution. When used it is preferably mixed with an aqueous pigment slurry or an aqueous dispersion of the amine compound before the pigment and amine compound are brought together. Suitable protective colloids include cellulose derivatives such as hydroxy ethyl cellulose, hydroxy propyl cellulose, polyvinyl alcohol, polyethylene oxide, polypropylene oxide, copolymers of ethylene oxide and propylene oxide, adducts of ethylene oxide or propylene oxide, polyvinyl pyrrolidone and its copolymers or mixtures of these compounds. The preferred compounds are those of the hydroxy ethyl cellulose type as exemplified by the Natrosol range of the Hercules Powder Company. The amount of protective colloid may be up to 15 percent, but is preferably less than 5 percent by weight of the pigment.

The process may be carried out at a selected temperature, at which the carrier is at least softened, but preferably dissolved in the amine derivative at the temperature used.

The mixture is originally formulated at or adjusted to a pH of at least that at which the amine compound is insoluble in water. The mixture is stirred at least until the pigment has migrated from the aqueous phase to the organic phase. Sufficient stirring is used to keep the droplets (or granules) in suspension. The size of granule is controlled to some extent by the speed of stirring. Increased stirring or turbulence gives a reduction in granule size. High turbulence and therefore small granules can be obtained by use of the modified mixed/emulsifier. The granules may be from 0.1 to 5 mm in diameter, but preferably from 0.5 to 2 mm in diameter.

The time of the process can be varied depending on the pigment used and the desired properties of the product. For example some pigments, particularly azo pigments, are susceptible to crystal growth when maintained in contact with the aniline compound, the amount of growth being dependent on the time of contact and the temperature. Increased crystal size gives a pigment having higher opacity. Therefore, in these cases and if a product with good opacity and improved rheology in the application system is required, the time of contact of the pigment with the amine compound can be increased. If, on the other hand, a pigment of this type is used but a product having good transparency is required, the process time can be shortened to that which is sufficient for the pigment to migrate into the organic phase. In these cases the addition of a carrier assists robust granule formation, thereby further shortening the process time. Selection of amine can also affect the opacity/transparency: aliphatic amines have less crystallising effect than aromatic amines and thus produce more transparent compositions.

With those pigments which show little or no tendency to crystal growth in the process, there is no benefit from increased time of contact of the pigment with the amine compound beyond that required to form granules. Granule formation in such instances is substantially assisted by the use of a carrier. In these cases granule formation is further assisted by the use of inorganic salts dissolved in the water during the contacting process. Especially typical of such pigments are those which have been treated with a crystallising solvent during a previous process stage, e.g. halogenated copper phthalocyanine (green).

The pH of the mixture is then reduced to below that at which the amine compound becomes completely soluble in water. This is usually below 7, preferably below 5, by the addition of an acid which will form a water-soluble salt with the amine compound. The preferred acids are hydrochloric acid and acetic acid. This causes the amine compound to dissolve in the water as a salt, leaving the organic carrier if used, and pigment granules in suspension. If necessary, e.g. to promote solution, or if desired for handling or product performance, the temperature of the mixture may be increased or decreased. The granules are then recovered by sieving, washing and drying. Any granules that are too small to be recovered in this way may be filtered off and re-used in a subsequent batch.

To recover the solvent, the pH of the filtrate is raised, usually to a pH above 7, e.g. 10, whereupon the solvent becomes insoluble, separates from the water and can be recovered for subsequent use by decantation for example. The aniline derivative may be further purified, if necessary, by steam distillation.

It is also possible to combine the granulation process of the present invention with a pigment solvent treatment process, to improve those pigment properties known to be improved by a solvent treatment. The solvent treatment can be carried out before or during the granulation step. For example, a phthalocyanine in a highly aggregated state of an α/β crystal form mixture, as produced by dry grinding may be de-aggregated and converted substantially to the β-form using the amine compound as the solvent in a solvent treatment process.

The granules, especially those of <1 millimeter diameter can be improved in free flowing nature initially and during storage by the addition of a small percentage for instance up to 2% by weight, of a finely divided inorganic or modified inorganic material conventionally used for imparting such properties, such as a finely divided silica or silicate; such materials may conveniently be added to the granules by simple mixing. Especially advantageous materials of this type are the finely divided silicas with surface modifications by organic groups such as the Aerosil R 972 ex. Degussa.

The products of the invention may be used for the pigmentation of any system, such as surface coating media, e.g. paint and ink, or plastics. The carrier used will normally be selected so as to be compatible with the system to be pigmented. The product, when incorporated into the system, releases the pigment from the granule to colour the material.

The invention is illustrated by the following Examples, wherein parts are parts by weight.

EXAMPLES 1-8

20 Parts of a pigment present in an aqueous slurry formed by conventional azo coupling techniques and 0.2 parts hydroxyethyl cellulose (Natrosol 250HR) were heated at pH8 to 85° C. A solution of 5 parts of an organic carrier in 15 parts of the appropriate amine was added and the mixture stirred for 1 hour at 85° C. The pH was then adjusted to ~1 and the granules recovered by filtration, washing and drying. All products could be dispersed into lithographic varnish. The following Table gives pigment carrier and amine used.

| EXAMPLE | PIGMENT | CARRIER | AMINE |
| --- | --- | --- | --- |
| 1 | Cl Pigment Yellow 13 | Hardened castor oil | NN'-dimethylbenzylamine |
| 2 | Cl Pigment Yellow 13 | Hardened castor oil | Di-isobutylamine |
| 3 | Cl Pigment Yellow 13 | Hardened castor oil | n-octylamine* |
| 4 | Cl Pigment Yellow 13 | Hardened castor oil | Primene 81R |
| 5 | Cl Pigment Yellow 13 | Hardened castor oil | 2-ethyl hexylamine |

-continued

| EXAMPLE | PIGMENT | CARRIER | AMINE |
| --- | --- | --- | --- |
| 6 | Cl Pigment Yellow 13 | Dicyclohexyl phthalate | 2-ethyl hexylamine |
| 7 | Cl Pigment Yellow 14 | Hercures A80 | 2-ethyl hexylamine |
| 8 | Cl Pigment Yellow 12 | Dicyclohexyl phthalate | 2-ethyl hexylamine |

*$C_{12}$ branched primary amine ex Rohm and Haas.

EXAMPLE 9

20 Parts of CI Pigment Yellow 13 as an aqueous slurry as prepared according to Example 9, 0.2 parts hydroxyethyl cellulose (Natrosol 250HR) and 5 parts dicyclohexylphthalate were heated at pH8 from 15° C. to 85° C. and 15 parts of 2 ethyl hexylamine was then added. The mixture was maintained at 85° C. for 1 hour, then adjusted to pH1.5 with 10N hydrochloric acid and the granules covered by filtration, washing and drying at 55° C. The product could be dispersed into a lithographic varnish.

What is claimed is:

1. A process for producing a pigment or dyestuff composition in the form of dustless readily-dispersible granules which comprises contacting, with agitation, (1) an aqueous dispersion of a pigment, (2) a protective colloid, (3) an aliphatic or araliphatic amine which is liquid at temperatures below 100° C., insoluble in water at pH values above 7, and soluble in water at pH values below 7, and (4) an organic carrier which has a melting point above 40° C. and which is soluble in, or at least softened by the amine and is insoluble or can be rendered insoluble in water throughout the pH range used in the process, the pH value being first above 7, maintaining the temperature above the melting point of the amine compound, stirring at least until the pigment has migrated from the aqueous phase to the organic phase consisting of the protective colloid and the amine, and then reducing the pH to below 7 to render the amine compound soluble in water, and recovering the resulting granules in a solvent-free condition.

2. A process as claimed in claim 1, in which the amine is a $C_6$-$C_{12}$ linear, branched alkyl or cycloalkyl amine.

3. A process as claimed in claim 1, in which the amount of amine is from 0.1 to 2 parts by weight per part of pigment.

4. A process as claimed in claim 1, in which the amount of amine is from 0.3 to 0.6 parts by weight per part of pigment.

5. A process as claimed in claim 1, in which the carrier is a carboxylic acid ester, a carboxylic acid amide, a phosphate ester, a resin, a vinyl polymer, a styrene polymer, a polyolefin, a fatty alcohol, a fatty amine which does not give water soluble salts, a fatty oxazoline, a water insoluble carboxylic acid or a rosin derivative.

6. A process as claimed in claim 1, in which the amount of carrier is from 0.05 to 2 parts by weight per part of pigment.

7. A process as claimed in claim 6, in which the amount of carrier is from 0.1 to 0.7 parts by weight per part of pigment.

8. A process as claimed in claim 1, in which the protective colloid is mixed with an aqueous pigment slurry or an aqueous dispersion of the amine before the pigment or dyestuff and amine are brought together.

9. A process as claimed in claim 1, in which the protective colloid is a cellulose derivative.

10. A process as claimed in claim 1, in which the amount of protective colloid is up to 15% by weight of the pigment or dyestuff.

11. A process as claimed in claim 10, in which the amount of protective colloid is less than 5% by weight of the pigment.

12. A process as claimed in claim 1, which is carried out at a temperature at which the carrier is dissolved in the amine.

13. A process as claimed in claim 1, in which the stirring is such as will produce granules of a size from 0.1 to 5 mm. in diameter.

14. A process as claimed in claim 1, in which the stirring is such as will produce granules of a size from 0.5 to 2 mm. in diameter.

* * * * *